J. LEDWINKA.
TRANSMISSION GEARING.
APPLICATION FILED OCT. 21, 1913.

1,268,131.

Patented June 4, 1918.
2 SHEETS—SHEET 1.

Witnesses:

Inventor
Joseph Ledwinka
By his Attorney

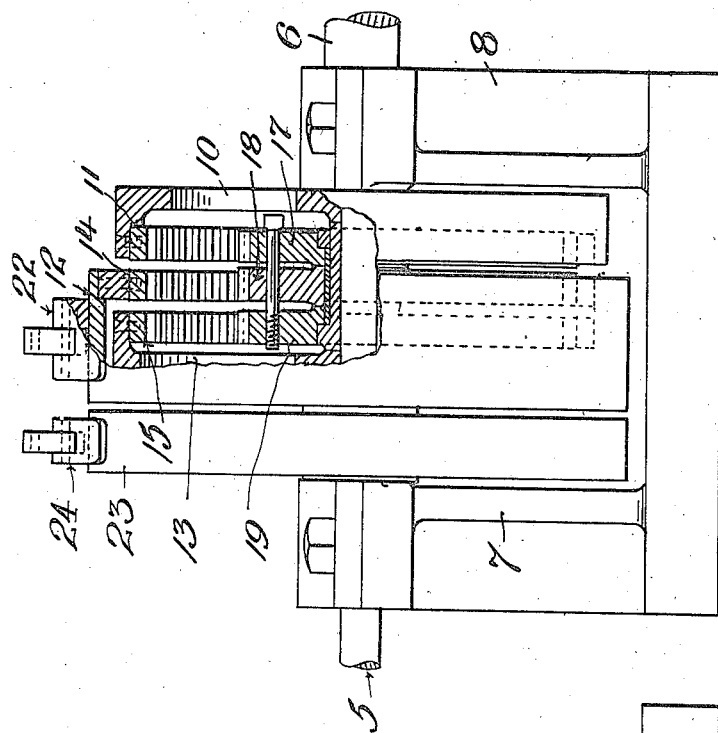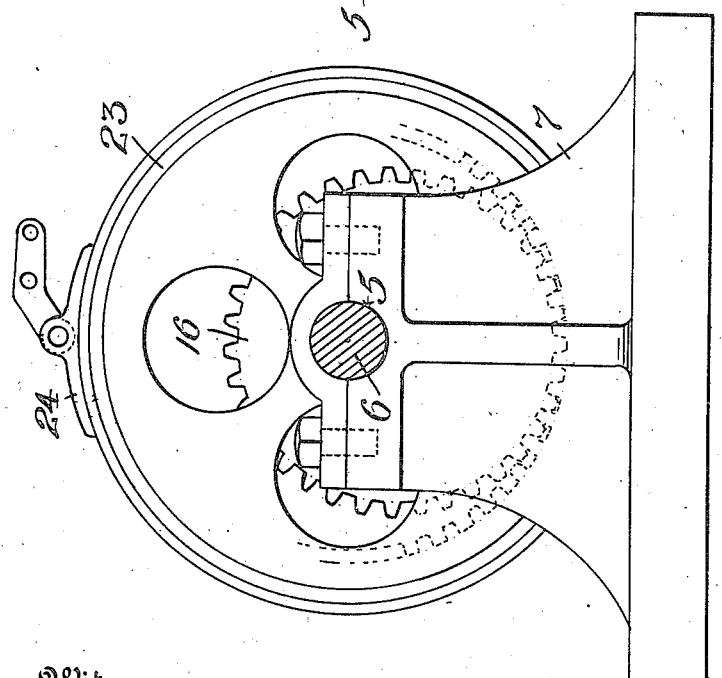

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

TRANSMISSION-GEARING.

1,268,131.      Specification of Letters Patent.      Patented June 4, 1918.

Application filed October 21, 1913. Serial No. 796,376.

*To all whom it may concern:*

Be it known that I, JOSEPH LEDWINKA, a citizen of the United States, residing at Philadelphia, county of Philadelphia, State of Pennsylvania, have made a certain new and useful Invention in Transmission-Gearing, of which the following is a specification.

This invention relates to transmission gearing.

The object of the invention is to provide a gearing for transmitting varying and reversing rotary motion.

A further object is to provide a construction of gearing which is simple and efficient for securing speed reduction and direction change in power transmission apparatus.

Other objects of the invention will appear more fully hereinafter.

The invention consists substantially in the construction, combination, location and relative arrangement of parts, all as will be more fully hereinafter set forth as shown in the accompanying drawings, and finally pointed out in the appended claims.

Referring to the accompanying drawings and to the various views and reference signs appearing thereon,—

Fig. 3 is an end view of the same, the driving shaft being in transverse section.

Fig. 4 is a view in side elevation, parts broken out and parts in vertical central longitudinal section, showing a modified construction embodying my invention.

The same part is designated by the same reference numeral wherever it occurs throughout the several views.

Figure 2:
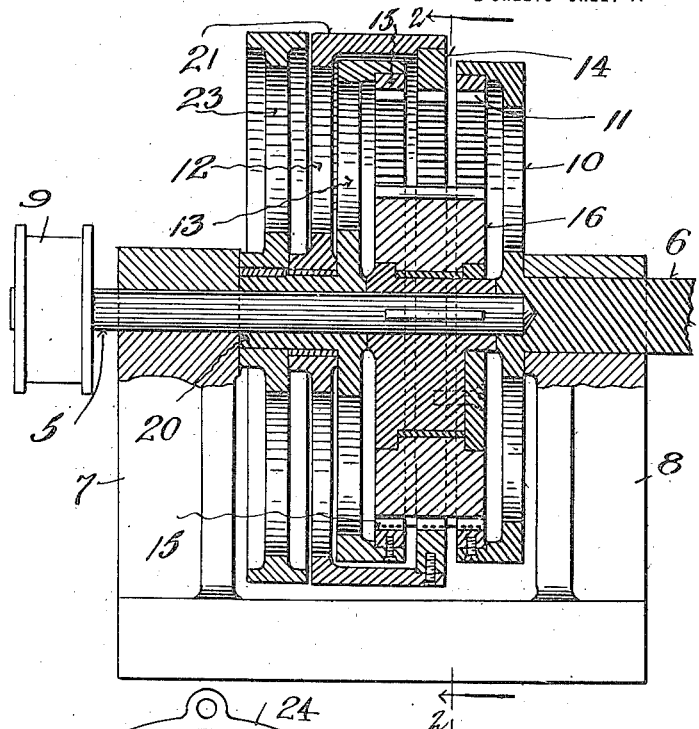
Fig. 2 is a view in vertical central longitudinal section of the same.
Figure 1:
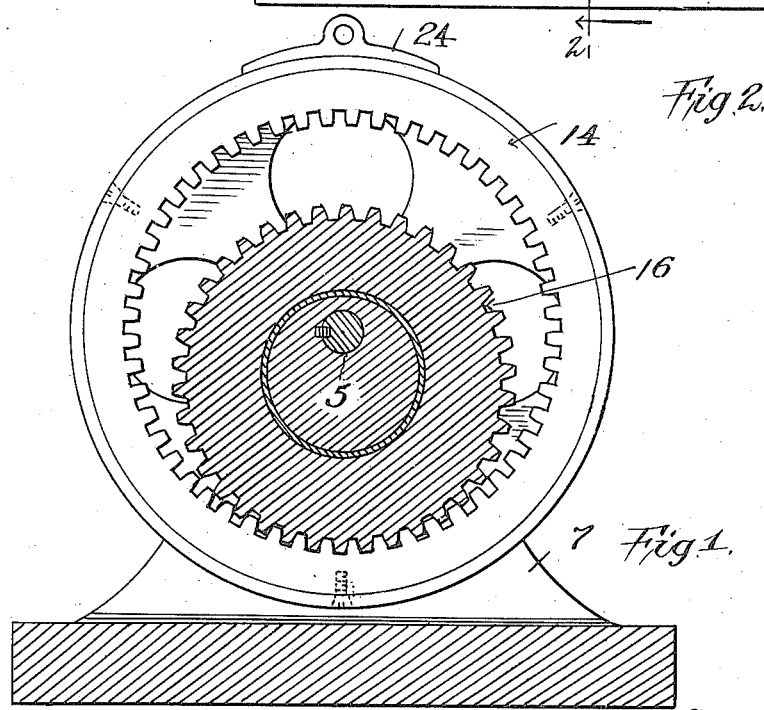
Figure 1 is a view in transverse section on the line 2, 2, Fig. 2, looking in the direction of the arrows, and showing a construction of gearing embodying the principles of my invention.

In the drawing 5, designates what I will term the driving shaft and 6 the driven shaft. These shafts are suitably journaled in standards 7, 8, of the supporting frame. The driving shaft is designed to be driven at a high speed and in constant direction from any suitable or convenient source of power, and I have shown a belt pulley 9, as an illustrative driving connection to said shaft 5. The driven shaft 6 is to be driven from shaft 5 at a reduced speed and either in the same or reverse direction with reference to the speed and direction of rotation of the drive shaft 5, the gearing presently to be described, accomplishing the desired variation in speed and direction of rotation of the driven shaft 6, or the arrest of said shaft, as occasion may require, without arresting or varying the speed or the direction of rotation of shaft 5. The driven shaft 6, is designed to be utilized for any desired purpose or to drive any desired machine or other gearing or for whatever purpose a power driven shaft may be employed.

Mounted upon to rotate with the shaft 6 is a member 10, having an annular gear 11 with internal teeth. Loosely mounted on the driving shaft are members 12, 13, 15, each carrying the annular gears 14, 15, each having internal teeth. The annular gears 11, 14, 15 are all of the same internal diameter. Eccentrically mounted upon the drive shaft 5, is a spur gear 16, which may be in one piece of uniform external diameter throughout, and having exterior teeth of sufficient length to simultaneously mesh with the internal gears 11, 14, 15, as shown in Fig. 2, or which may be made in separate parts 17, 18, 19, of an equal external diameter, said parts being bolted or otherwise secured together, and having external gear teeth respectively meshing with the internal annular gears 11, 14, 15, as shown in Fig. 4. I shall refer to this element as the eccentric gear and wish to be understood as including thereby the single part construction of Fig. 2 or the separate part construction of Fig. 4. In either case the eccentric gear is loosely sleeved, eccentrically, upon the drive shaft 5, to rotate thereon. The gear teeth of the eccentric gear and of the annular gears are all formed on the same pitch line, and this is one of the important features of my invention. The relative numbers of gear teeth of the internal gears 11, 14, 15, Figs. 2 and 4 or of the parts 17, 18, 19, of the eccentric gear Fig. 4, in accordance with my invention, are varied, as desired to secure the desired results. For illustration the annular gear 11, may have, say 50 gear teeth while the annular gears 14, 15, may have, respectively, 49 and 51. In this case, as will appear more fully hereinafter, a fifty to one speed reduction is secured between shafts 5 and 6, in certain conditions of control, while a reduction of forty nine to one but in the reverse direction is secured in another condition of control. As above indicated, it is immaterial whether the variations in relative numbers of gear teeth occur in the annular internal gears or in the three part eccentric gear, and consequently when I refer to relative variations in the numbers of the gear teeth of these members I wish to include either case.

With the arrangement above described it will be seen that when the gears 14, 15, are both free to revolve the eccentric gear will not have any axial rotation imparted thereto and therefore will exert no rotative action upon the internal gear 11, and consequently the driven shaft 6 will not be rotated. If, however, either one or the other of the internal gears 14, 15, is locked against rotation, then the eccentric gear will be axially rotated, in which case the gear 11, and with it the shaft 6 will be rotated at the speed reduction and in the direction dependent upon which one of the gears 14, 15, is locked. While I have mentioned fifty, forty-nine and fifty-one as the relative numbers of the gear teeth of the gears, I wish it to be understood that these numbers are given merely for illustrating purposes as any other relative numbers of teeth may be employed so long as they all remain on the same pitch line and are of equal internal diameter. The important feature being that the gear 11 on the driven shaft or its driving spur gear member, has a greater number of teeth than one of the remaining annular or spur gear members, and a less number than the other of the annular or spur gear members, in order to secure the desired results.

Any desired means may be provided for effecting the locking of the gears as above described. I have shown a simple arrangement and also a mounting of the annular gear members, which secures compactness, and wherein the member 13 is provided with an extended hub 20 loosely sleeved upon shaft 5, while the hub of member 12 is loosely journaled upon hub 20. The member 12 is provided with an overhanging cylindrical portion 21 which encompasses and incloses the member 13 and its gear 15. The carrier 12 may be locked by applying a suitable brake, indicated at 22, Fig. 4 to the exterior cylindrical surface 21 of said member. In order to lock the member 13 and its internal annular gear 15, I mount a brake wheel 23 upon the hub 20 of said member 13, and key the same thereto, and apply a suitable brake, indicated at 24, to the exterior cylindrical surface of said brake wheel.

Having now set forth the objects and nature of my invention and constructions embodying the principles thereof, what I claim as new and useful and of my own invention, and desire to secure by Letters Patent is:—

1. In a transmission gearing, a drive shaft, an externally toothed gear member loosely mounted eccentrically thereon, a driven shaft, an internally toothed annular gear member carried thereby and rotating therewith, and loosely journaled internally toothed annular gear members of equal internal diameter with each other and with said first named internally toothed annular gear member, said externally toothed gear member meshing with all of said internally toothed internal gear members, said gear members having their gear teeth formed on the same pitch line but varying from each other in the relative numbers of their teeth, and means for locking one or the other of said loosely journaled gear members.

2. In a transmission gearing, a drive and a driven shaft, intermediate gear members therebetween including annular internally toothed gears of equal internal diameters, and an externally toothed eccentrically mounted gear, all of said gears having gear teeth formed on the same pitch line but with relatively varying numbers of teeth, and means for independently locking one of said intermediate annular gear members.

3. In a transmission gearing, a drive shaft and a driven shaft, a gear loosely mounted eccentrically on said drive shaft, an internal gear mounted on and rotating with the driven shaft, and independent internal gears of equal internal diameter loosely mounted on said drive shaft, said eccentric gear of uniform external diameter and meshing with all of said internal gears, said gears having teeth formed on the same pitch line but which relatively vary in number.

4. In a transmission gearing, a drive shaft, a spur gear eccentrically mounted thereon, a driven shaft having an internal gear meshing with the eccentric gear, independent internal gears loosely mounted on said drive shaft and also meshing with said spur gear, said loosely mounted gears being of equal internal diameter with and respectively having a larger and a smaller number of gear teeth than the internal gear on the driven shaft and means for locking independently said loosely mounted gears.

5. In a transmission gearing, a drive shaft, a spur gear eccentrically mounted thereon, a driven shaft, an internal gear mounted thereon to rotate therewith, independent internal gears loosely journaled and being of equal internal diameter and respectively having a greater and a smaller number of teeth than the internal gear on the driven shaft all of said internal gears meshing with the eccentric gear and brake devices for independently locking said loosely mounted gears.

6. In a transmission gearing, a drive shaft, a spur gear eccentrically mounted thereon, members loosely journaled on said shaft and having internal gears, a driven shaft having a member mounted to rotate therewith, and having an internal gear, all of said internal gears being of equal internal diameters and having their teeth on the same pitch line and meshing with said eccentric gear, said loosely mounted gears having, respectively a greater and a smaller number of teeth than the gear on the driven shaft, and means to independently lock said first mentioned members against rotation.

7. In a transmission gearing, a drive shaft, a spur gear eccentrically mounted thereon, a member having an extended hub loosely sleeved upon said shaft, and carrying an internal annular gear, a member loosely journaled upon said hub and having an overhanging cylindrical portion to encompass the first mentioned member, and carrying an internal gear, a brake wheel keyed upon said hub, a driven shaft having an internal gear, all of said internal gears being of equal internal diameters and meshing with said eccentric gear, said first mentioned gears having respectively a greater and a smaller number of gear teeth than the gear on the driven shaft, and means to independently restrain said brake wheel and overhanging carrier against rotation.

In testimony whereof I have hereunto set my hand in the presence of the subscribing witnesses, on this 8th day of October, A. D. 1913.

JOSEPH LEDWINKA.

Witnesses:
S. E. DARBY,
G. A. McGRATH.